United States Patent [19]

Leorat

[11] 4,067,246
[45] Jan. 10, 1978

[54] AUTOMATIC CHANGE-SPEED TRANSMISSION MECHANISM

[75] Inventor: François Leorat, Boulogne-Billancourt, France

[73] Assignees: Regie Nationale des Usines Renault, Boulogne-Billancourt; Automobiles Peugeot, Paris, both of France

[21] Appl. No.: 664,669

[22] Filed: Mar. 8, 1976

[30] Foreign Application Priority Data

Mar. 7, 1975 France ............................. 75.07139

[51] Int. Cl.² ........................................... F16H 3/08
[52] U.S. Cl. ................................... 74/329; 74/695
[58] Field of Search ................. 74/329, 330, 694, 695, 74/700, 701; 192/87.11, 87.15

[56] References Cited

U.S. PATENT DOCUMENTS 3,474,690  10/1969  Lepelletier ..................... 74/695 X

*Primary Examiner*—Samuel Scott
*Assistant Examiner*—Frank H. McKenzie, Jr.
*Attorney, Agent, or Firm*—Fleit & Jacobson

[57] ABSTRACT

The invention relates to an automatic change-speed transmission mechanism, notably for motor vehicles, of the type providing the forward speeds and a reverse transmission ratio, of the type comprising two clutches and an idle pinion mounted on the output shaft and formed with an axially-extending integral hub constituting the hub of a second clutch. The housing of the first clutch is adjacent to the side face of said idle pinion, to the side face of the hub of said second clutch and to the housing of the second clutch.

3 Claims, 1 Drawing Figure

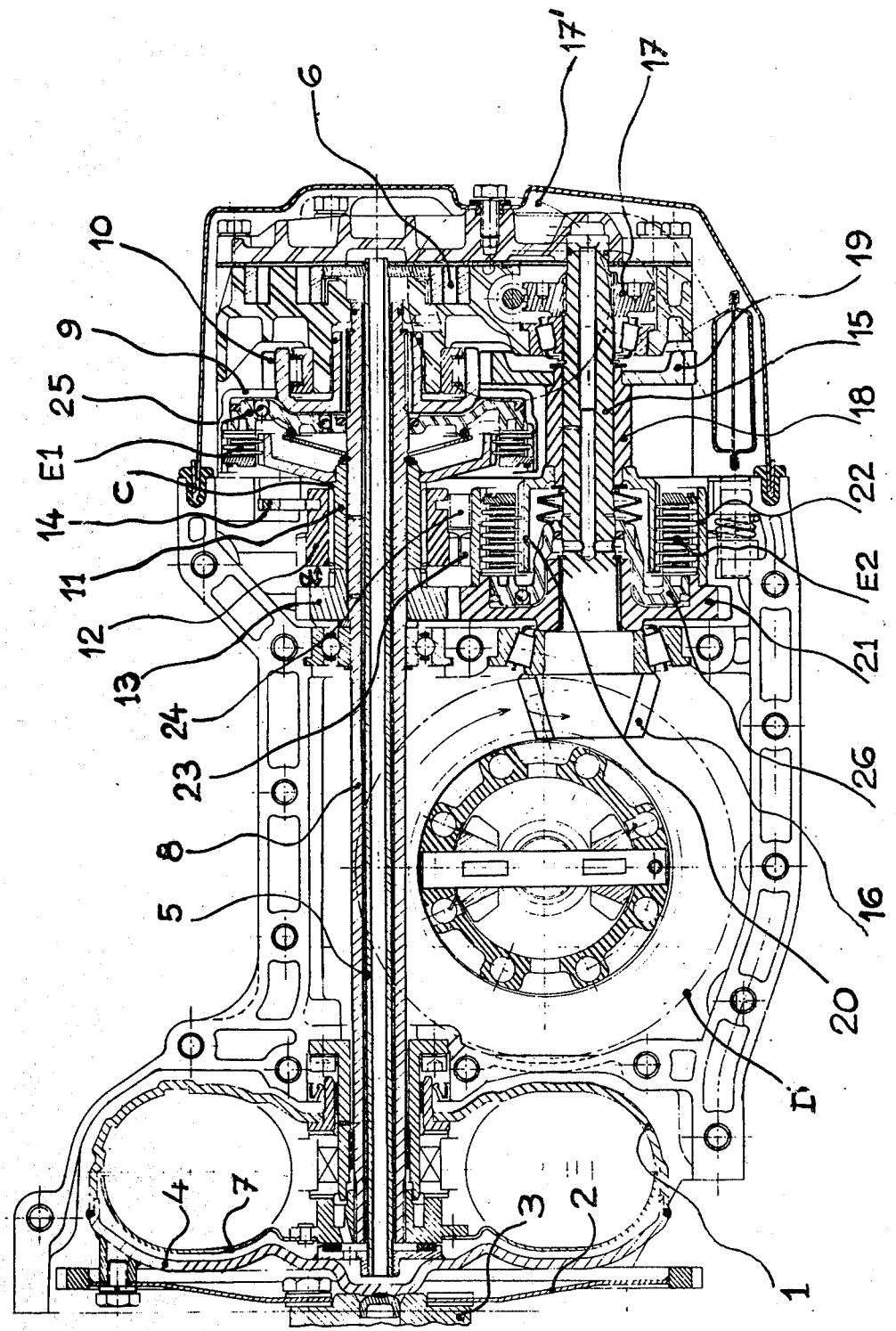

AUTOMATIC CHANGE-SPEED TRANSMISSION MECHANISM

The present invention relates in general to change-speed transmission mechanisms or gearboxes, notably for motor vehicles, and has specific reference to an automatic change-speed mechanism or transmission providing two forward speeds or gear ratios and one reverse speed or gear ratio, this mechanism being based on technical principles directed essentially to reducing its axial overall dimension.

The invention is also concerned with an automatic change-speed transmission mechanism permitting the construction of power units having an integrated or built-in differential disposed either transversely to, or along the longitudinal median line of the vehicle, at the front, at the rear or between the two axles of the vehicle.

The present invention relates more particularly to a parallel-shaft change-speed transmission or gearbox of the type set forth hereinabove and comprising essentially:

a first multi-plate clutch hydraulically controlled by means of a piston movable in a first bell-shaped housing for controlling the low forward speed ratio and the reverse ratio, a second multi-plate clutch hydraulically controlled by a piston movable in another bell-shaped housing for controlling the high speed ratio, and pistons for hydraulically controlling said first and second clutches.

In change-speed mechanisms of the this type the clutches are identical although they operate under different conditions. Thus:

The first clutch is adapted to transmit the torque from a neutral position through the low forward gear and the reverse gear, respectively; therefore, in this case a relatively low torque is transmitted at relatively low clutch-linings velocities when changing from neutral to forward and from neutral to reverse; on the one hand, when operating through the first gear ratio or low forward speed, the first clutch transmits the torque from the converter turbine; the same clutch transmits a relatively high torque when the first or low forward gear is engaged from the high gear at substantially zero clutch-lining speed;

the second clutch transmits the torque when the high forward gear is engaged from the first or low ratio, i.e. when the relative velocity of the friction lining is relatively high.

From the foregoing it is clearly apparent that one of the clutches is ill-suited for the operating conditions thus provided, and that this one clutch should be constructed with different dimensions in order to prevent any faulty operation thereof.

According to this invention, the problem set forth hereinabove is solved by providing a change-speed transmission of the above-mentioned type, wherein an idle pinion mounted for loose rotation on the output shaft has a hub rigid with the hub of the second clutch and that the bell-shaped housing of the first clutch is adjacent on the one hand to the side or circular face of this idle pinion and on the other hand to the side or circular face of the hub of said second clutch and also to the bell-shaped housing of said second clutch.

In a change-speed transmission mechanism thus constructed the diameter of the bell-shaped housing of the first clutch is limited only by the distance between centres of the input and output shafts.

According to another feature characterising this invention, the axial length of the bell-shaped housing of the second clutch is substantially equal to the sum of the thicknesses of the driven reverse-speed pinion and of the sliding pinion mounted for loose rotation on a countershaft, plus the stroke necessary for engaging the dog teeth of the reversespeed pinion.

The axial overall dimension of the second clutch is such that the number of plates or disks thereof can be increased considerably with a view to provide a total friction lining surface consistent with a proper heat dissipation and a sound torque transmission of notwithstanding the relatively reduced radial dimensions of its control piston and of the various friction plates or disks.

Other features and advantages characterising this invention will appear as the following description proceeds with reference to the attached drawing illustrating diagrammatically in a single FIGURE a longitudinal axial section of the change-speed mechanism of this invention.

In the exemplary form of embodiment illustrated in the drawing, the engine torque is transmitted to the pump 1 of the hydrokinetic torque converter C via a driving plate 2 connected on the one hand to the crank shaft 3 of the thermal engine (not shown) and on the other hand to the driven rotor 4 of the converter.

A first tubular shaft 5 rigid with the driven rotor 4 extends longitudinally throughout the gearbox and is adapted to drive the feed pump 6 of the transmission mechanism at the engine rotational speed. The output torque of the converter C is received by the turbine 7 and transmitted via a second tubular shaft 8 constituting the input shaft of the change-speed mechanism and surrounding the first tubular shaft 5 to the bellshaped housing 9 of the first clutch E1 rigid with said second tubular shaft 8. The housing 9 consists in fact of an assembly comprising a pinion 10 acting as a driving pinion when the second forward gear is engaged to provide the high forward ratio.

The hub 11 of the first clutch E1 is mounted for free rotation on the second tubular shaft 8 and adapted to drive through splines c the driving or input reverse-speed pinion 12 slidably mounted on said splines c.

The sliding pinion 12 is adapted through dog teeth to cause the first-speed driving and loose pinion 13 to rotate bodily with the hub 11 of the first clutch E1.

The axial movement of pinion 12 is obtained by means of a sliding fork 14 controlled by hydraulic means (not shown). The output shaft 15 which, in the form of embodiment illustrated, constitutes the stub shaft or shank of the driving pinion 16 of the differential mechanism D carries a worm pinion 17 adapted to drive the vehicle speed detecting device designated by the reference numeral 17'. Mounted for loose rotation on this secondary or counter-shaft 15 is a hub 18 rigid with the second free-rotating pinion 19 constituting the second-gear driven pinion in constant meshing engagement with the pinion 10 carried by the bell-shaped clutch housing 9.

The hub 18 is also rigid with the hub 20 of the second clutch E2. The pinion 19 and hub 20 are so arranged that the bell-shaped housing 9 of the first clutch E1 be interposed between said pinion and hub 10, 20. Therefore, the housing 9 may have a greater diameter as consistent with the distance between centers of the input and output shafts. The output shaft 15 is drivingly coupled through splines to another pinion 21 constituting the low or first speed driven pinion in constant meshing engagement with said pinion 13. This pinion 21 has an axial extension in the form of a housing 22 constituting the bell-shaped housing of the second clutch E2.

The bell-shaped housing 22 of the second clutch E2 carries the teeth of the driven pinion 23 for the reverse gear. This driven pinion 23 is also in meshing engagement with a sliding pinion 24 mounted for loose rotation on an auxiliary shaft (not shown). The arrangement of housing 22 of clutch E2 in the mechanism is such that its length is substantially equal to the sum of the thicknessesses of pinions 23 and 24, plus the stroke $e$ necessary for causing the engagement of the dogs or sliding pinion 12.

The clutches E1 and E2 are adapted to be actuated hydraulically by means of pistons 25 and 26, respectively, the diameters of these pistons being slightly smaller than the diameter of said bell-shaped housings 9 and 22.

The following Table illustrates the mode of operation of the change-speed mechanism of this invention.

| ENGAGED RATIO | E1 | E2 | Sliding pinion 12 | Sliding pinion 24 |
|---|---|---|---|---|
| Reverse | Engaged | Disengaged | Dogs released | In meshing engagement |
| Neutral | Disengaged | Disengaged | Dogs engaged | |
| First gear (low) | Engaged | Disengaged | Dogs engaged | |
| Second gear (high) | Disengaged | Engaged | Dogs engaged | |

From this table, it will be seen that the clutches E1 and E2 have the same functions as those of conventional gearboxes but in contrast thereto said clutches E1 and E2 operate under considerably improved torque and heat-dissipating conditions.

In fact, it is known that in a hydraulically controlled multi-plate clutch the transmissible torque is proportional to the control piston surface area, to the mean radius of the friction plates and to the number of these plates, and that the heat power likely to be dissipated is proportional to the surface area of the friction plate linings.

With the imbricated arrangement of the clutches E1 and E2, as disclosed in the foregoing, it is possible to so dimension these clutches that they can operate under the best possible conditions while imparting a considerably strength and capacity to the entire transmission mechanism. In fact, the radial dimensions of the bell-shaped housing 9 and also of the control piston 25 of the first clutch E1 are limited only by the distance between centers of the input and output shafts 8, 15, which as a rule is a constructional and predetermined characteristic of the vehicle. Thus, the combination of a piston having a relatively large surface area with linings having a relatively great means radius yields a high torque transmission capacity by using only a limited number of plates, i.e., with a relatively small axial overall dimension of the clutch system.

The relatively considerable axial overall dimension of the second clutch is permitted without inasmuch increasing the axial overall dimension of the transmission mechanism as required by the necessary dimensions of the pinions 12 and 24 disposed thereabove. Therefore, a relatively great number of plates may be incorporated in this clutch E2 in order to obtain a considerable friction area sufficient for properly dissipating the friction heat. Consequently the second clutch E2 is capable of transmitting a sufficient torque though the radial dimensions of the piston 26 and the lined plates are reduced appreciably in comparison with those of conventional transmissions of this kind.

What is claimed is:

1. In an automatic change-speed transmission mechanism having two forward transmission ratios and one reverse transmission ratio, said mechanism further comprising an input shaft, a first bell-shaped clutch housing rigidly mounted on the input shaft, a first multi-plate clutch rotatably mounted within the first bell-shaped clutch housing on the input shaft and being hydraulically controlled by a first piston moveable in the first bell-shaped clutch housing, the first piston moving the first multi-plate clutch between a disengaged position and an engaged position in frictional engagement with portions of the first bell-shaped clutch housing, a first idle pinion mounted for free rotation on the input shaft and being connectably to the first multiplate clutch, a first fixed pinion rigidly mounted on the input shaft, an output shaft parallel to the input shaft, a second bell-shaped clutch housing rigidly mounted on the output shaft, a second multi-plate clutch rotatably mounted within the second bell-shaped clutch housing on the output shaft and being hydraulically controlled by means of a second piston moveably in the second bell-shaped clutch housing, the second piston moving the second multi-plate clutch between a disengaged position and an engaged position in frictional engagement with portions of the second bellshaped clutch housing, a second idle pinion connected to the second multi-plate clutch and mounted for free rotation on the output shaft in meshing engagement with the first fixed pinion, a second fixed pinion rigidly connected to the output shaft and being in meshing engagement with the first idle pinion, the first of the two forward transmission ratios being formed by the first idle pinion being connected to and rotated by the first multi-plate clutch in the engaged position and driving the second fixed pinion, the second of the two forward transmission ratios being formed by the first fixed pinion driving the second idle pinion with the second multi-plate clutch being in the engaged position and the first multi-plate clutch being in the disengaged position, the improvement wherein the distance between the axial centers of the input and output shafts is sufficient to allow positioning of a reverse gear driven pinion on the second bell-shaped housing and wherein a reverse driving pinion is connected to the first multi-plate clutch and slideably mounted on the input shaft for movement between a released position and an engaged position, in the engaged position the reverse driving pinion connecting the first idle pinion to the first multiplate clutch and in the released position the reverse driving pinion being in meshing engagement with the reverse gear driven pinion, the reverse transmission ratio being formed by the first multi-plate clutch being in the engaged position and rotating the reverse driving pinion thereby driving the reverse gear driven pinion through its meshing engagement with the reverse driving pinion in its released position.

2. A transmission mechanism as claimed in claim 1 wherein the improvement further comprises a sliding pinion moveably into meshing engagement with the reverse gear driven pinion and wherein the axial length of the second bell-shaped housing is greater then the sum of the thicknesses of the driven reverse pinion and the sliding pinion, plus the distance between the released and engaged position of the reverse driving pinion.

3. An automatic change-speed transmission mechanism having two forward transmission ratios and one reverse transmission ratio comprising:

a gear box;

an input shaft rotatably supported in the gear box;

a first idle pinion mounted for free rotation on the input shaft;

a sliding pinion mounted for axial movement and free rotation on the input shaft and having teeth for engaging the first idle pinion;

a first multi-plate clutch assembly having a first hub mounted for free rotation on the input shaft, the first hub being connected to and rotating the sliding pinion;

means for axially moving the sliding pinion between a released position and an engaged position connecting the first idle pinion for rotation by the first multi-plate clutch assembly;

a first bell-shaped housing, rigidly mounted on the input shaft, for the first multi-plate clutch assembly;

first piston means movable within the first bell-shaped clutch housing for frictionally engaging and disengaging the first multi-plate clutch assembly with the first bell-shaped housing;

a first fixed pinion rigidly mounted on the input shaft;

an output shaft rotatably supported by the gear box in parallel relationship with the input shaft;

a first output speed pinion rigidly mounted to the output shaft for rotating the output shaft, the first output speed pinion being in meshing engagement with the first idle pinion and being driveable by the first idle pinion to form one of the two forward transmission ratios when the sliding pinion is in the engaged position and the first piston means has moved the first bell-shaped clutch assembly into frictional engagement with the first bellshaped housing;

a second bell-shaped clutch housing rigidly mounted to the output shaft and having a greater axial length and a shorter radial width then the first bell-shaped clutch housing;

a reverse gear driven pinion mounted on the second bell-shaped clutch housing and being driveable by the sliding pinion in the released position to form the reverse transmission ratio when the first piston means has moved the first multi-plate clutch assembly into frictional engagement with the first bell-shaped clutch housing;

a second multi-plate clutch assembly contained within the second bell-shaped clutch housing and having a second hub mounted for free rotation on the output shaft;

second piston means moveable within the second bell-shaped clutch housing for frictionally engaging and disengaging the second multi-plate clutch assembly with the second bell-shaped housing; and a second idle pinion mounted for free rotation on the output shaft and connected to rotate the second multi-plate clutch assembly, the second idle pinion being in meshing engagement with the first fixed pinion and being driveable by the first fixed pinion to form the second of the two forward transmission ratios when the sliding pinion is in the engaged position, the first piston means has disengaged the first multi-plate clutch assembly from the first bell-shaped housing, and the second piston means as moved the second multi-plate clutch assembly into frictional engagement with the second bell-shaped housing.

* * * * *